United States Patent [19]

Banks

[11] 3,860,050

[45] Jan. 14, 1975

[54] SIGN-MAKING METHOD AND APPARATUS

[75] Inventor: Donald D. Banks, Ft. Collins, Colo.

[73] Assignee: Bellbanks, Inc., Denver, Colo.

[22] Filed: Jan. 19, 1973

[21] Appl. No.: 325,052

[52] U.S. Cl................. 144/144.5, 83/565, 90/13.2, 144/144 R, 144/83
[51] Int. Cl............................................. B27c 5/10
[58] Field of Search ............. 83/565; 90/13.1, 13.2; 144/82, 83, 134, 136, 137, 144, 144.5, 27

[56] References Cited
UNITED STATES PATENTS

| | | | |
|---|---|---|---|
| 1,751,816 | 3/1930 | Hunter............................ | 144/144.5 |
| 2,427,081 | 9/1947 | Zern ............................ | 144/144.5 X |
| 2,495,519 | 1/1950 | Gregson et al...................... | 90/13.1 |
| 2,957,507 | 10/1960 | Vargo............................. | 144/144.5 |
| 3,099,299 | 7/1963 | Gilfry............................ | 144/144.5 X |
| 3,301,287 | 1/1967 | Edwards ........................... | 144/144 |
| 3,434,385 | 3/1969 | Ray............................... | 144/144 X |
| 3,442,309 | 5/1969 | Jentsch............................ | 144/144 |
| 3,450,001 | 6/1969 | Fortune ........................... | 144/144.5 X |

Primary Examiner—Andrew R. Juhasz
Assistant Examiner—W. D. Bray

[57] ABSTRACT

A method of and apparatus for engraving signs and the like utilizes a technique wherein letters, numerals or other configurations are engraved in a workpiece without the necessity of first centering the workpiece, by progressively advancing the workpiece lengthwise through a guide path disposed beneath a template holder and successively placing desired templates in the holder as the workpiece is advanced thereunder. The guide path will accommodate boards of different widths and thicknesses and the holder is adapted to receive templates of different sizes according to the size of the sign to be formed. After the sign has been engraved, it is finished by painting the engraved face, then removing a thin layer of the engraved face so as to remove the paint from the surface, leaving only the engraved or inset portions painted.

18 Claims, 15 Drawing Figures

PATENTED JAN 14 1975 3,860,050
SHEET 1 OF 4
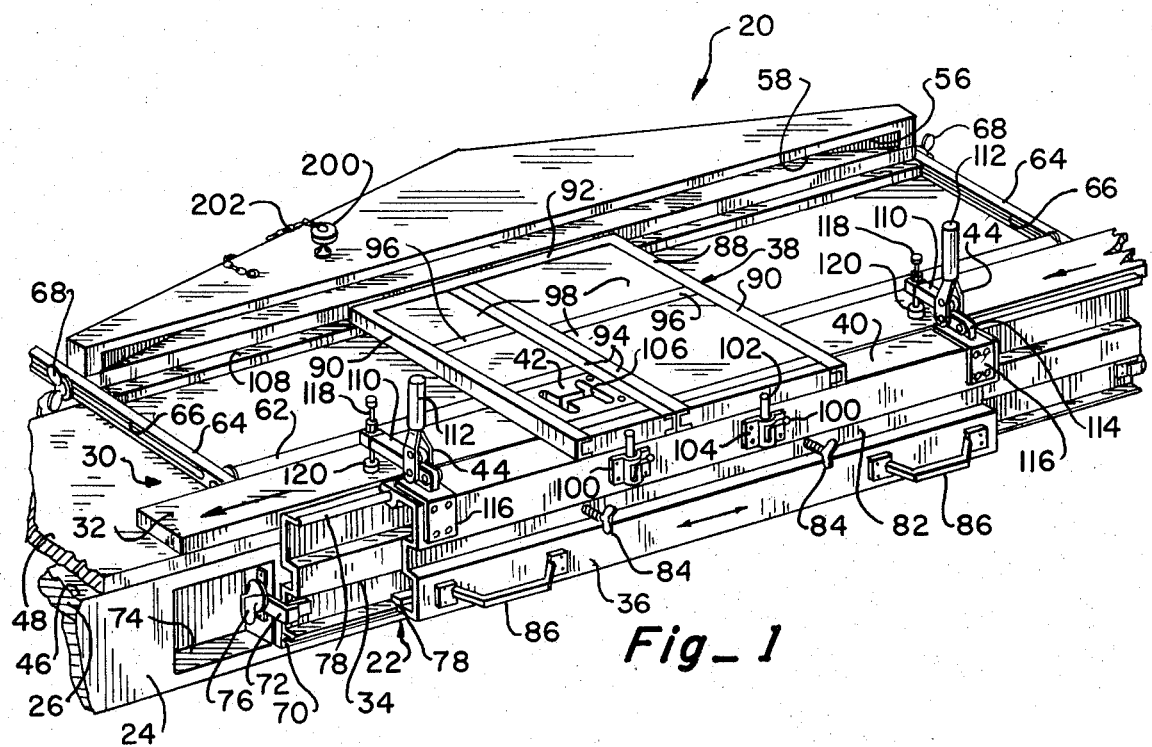
Fig_1
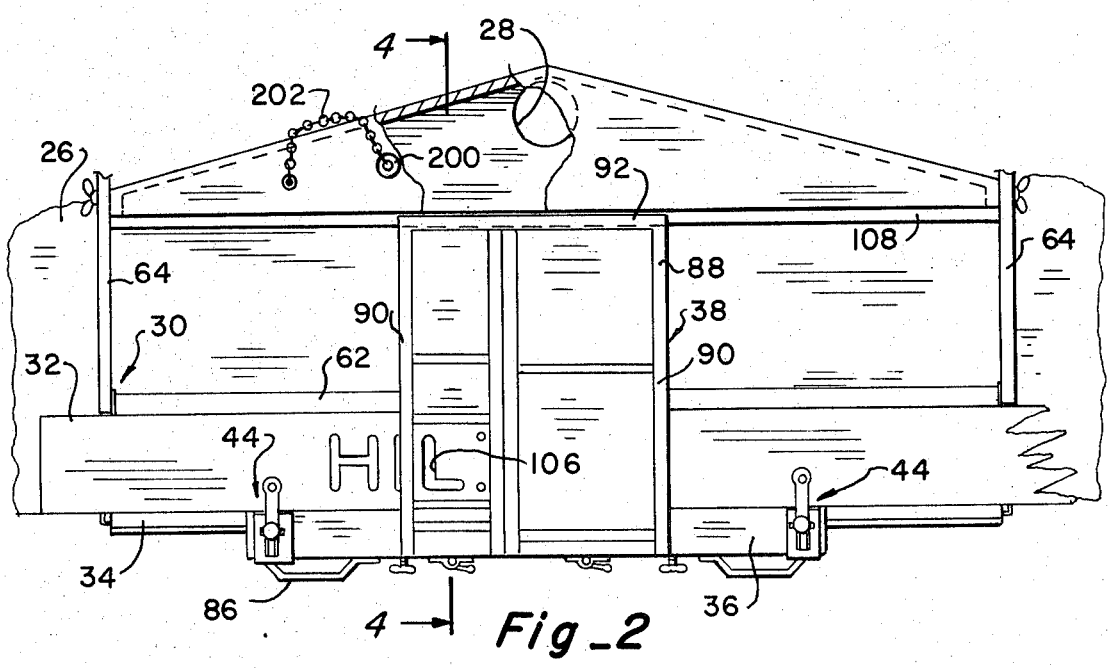
Fig_2

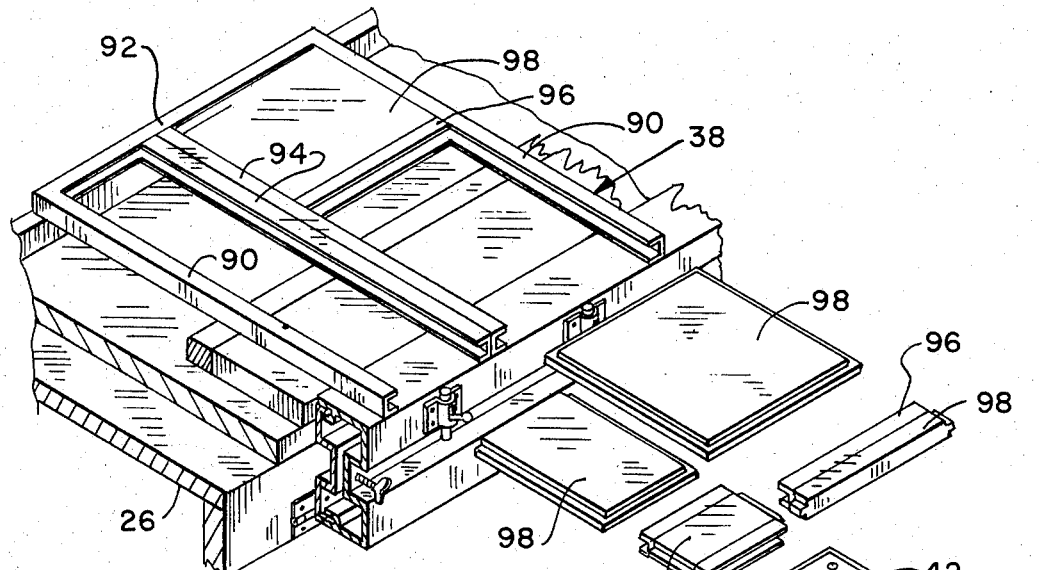
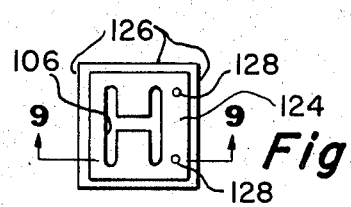
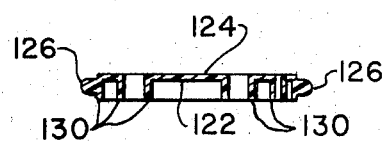
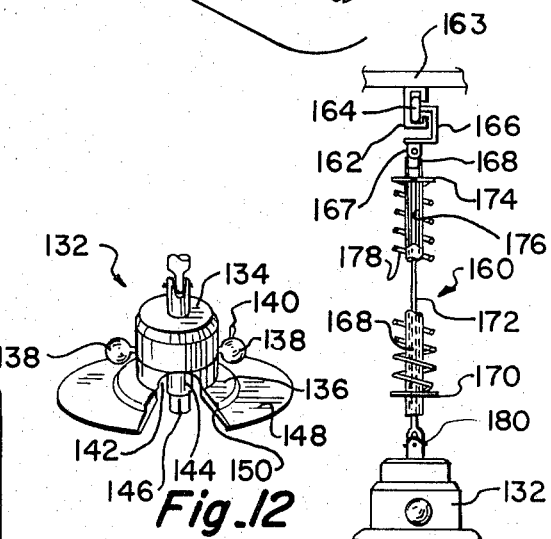
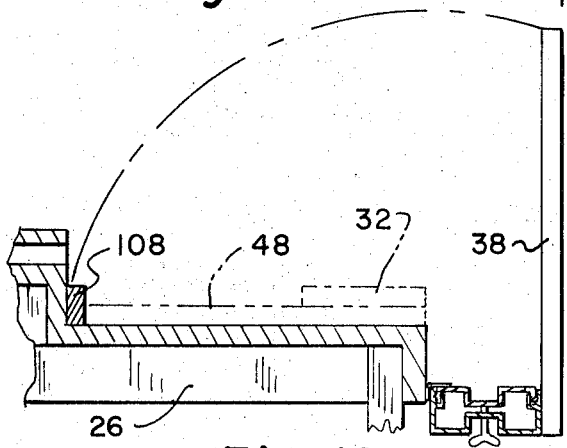
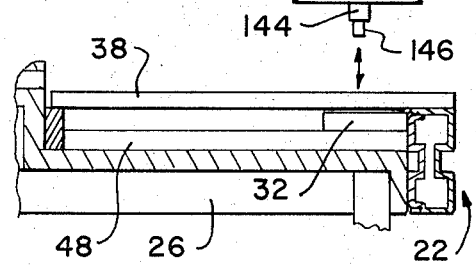

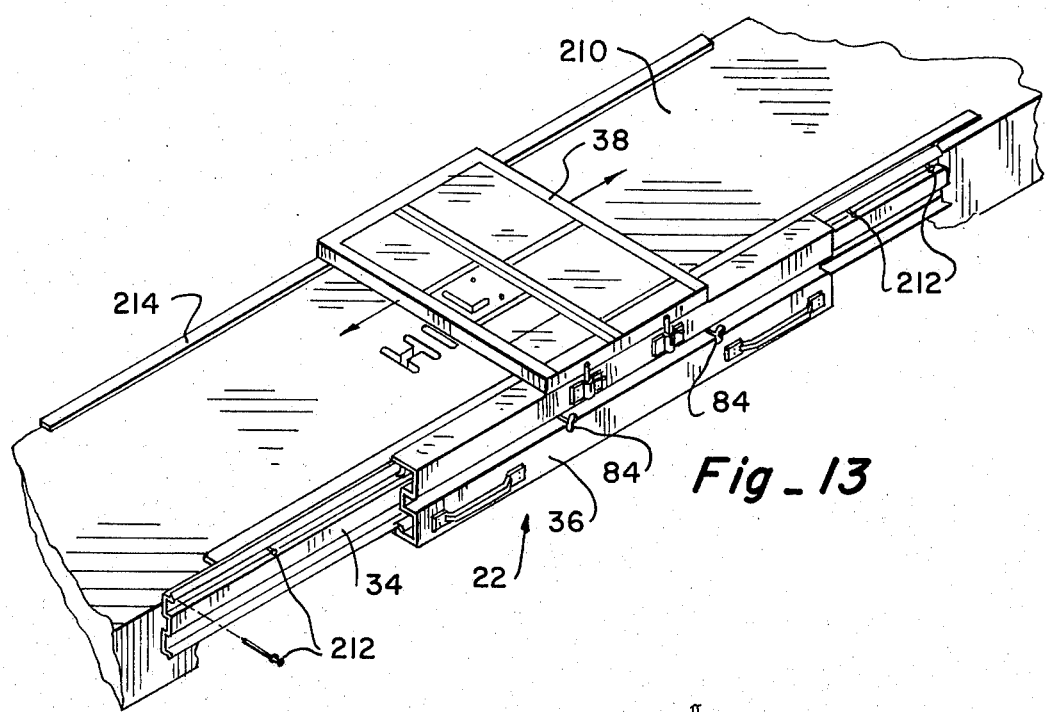
Fig_13
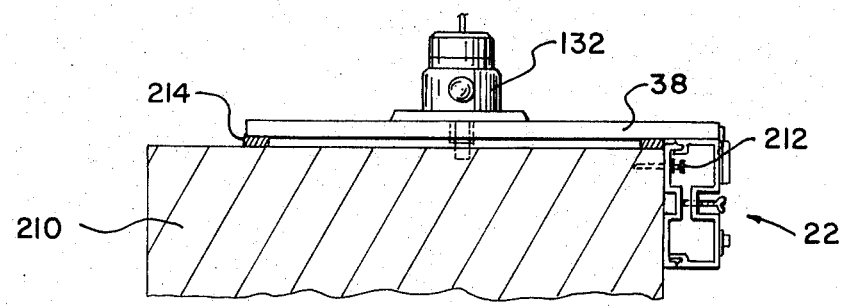
Fig_14
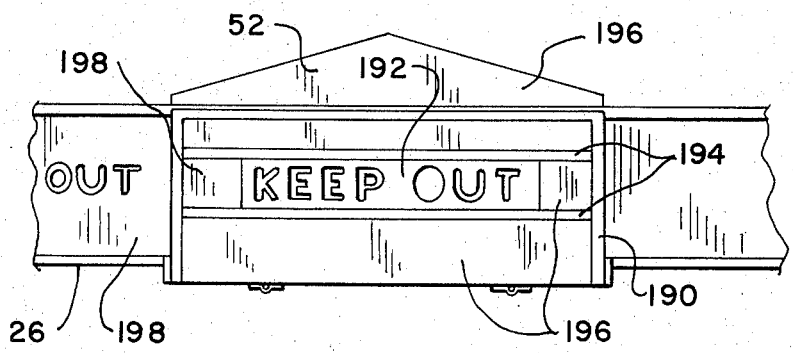
Fig_15

SIGN-MAKING METHOD AND APPARATUS

The present invention generally concerns the art of making engraved signs and more particularly concerns a method and apparatus for making wooden signs in which the letters or other indicia are engraved or inset into the wood and stained or painted a desired color.

Traditionally, wooden signs have been made by measuring and laying out the letters that are to be engraved in the sign, cutting the letters by a free-hand method, sanding the face of the sign to remove rough portions thereof, and finally carefully painting the engraved areas of the sign by hand. This method is time-consuming, frequently does not result in a neat attractive sign and is not reliable in mass-producing a large number of signs of equal quality.

With the advent of the router it was possible to rout letters and signs rather than hand-carve them; however, even with a router, it has been necessary first to measure and then to carefully place and hold the templates on the sign while the router is operated to cut the desired letters. Apparatuses have been devised to avoid the tedious task of measuring and laying out the letters prior to engraving, but are not entirely satisfactory.

The method and apparatus of the present invention lends itself to the manufacture of wooden signs in which the letters or other indicia are routed or otherwise engraved in the surface of the wood, and since a continuous length of a board may be advanced through the apparatus and formed into a plurality of signs of the same length, or different lengths, the necessity of centering the board for each sign is avoided. This is done by progressively advancing the board lengthwise through a guide path disposed beneath a template holder and successively placing templates of each letter, numeral or other desired configuration making up the sign in the holder as the workpiece is advanced therebeneath and cutting the board after the sign is completed to leave even margins at each end. The guide path will accommodate workpieces of different widths and thicknesses and the holder is adapted to receive templates of different sizes according to the size of each sign to be formed.

The template holder, in addition to retaining templates, is adapted to support a cutting tool with its cutting blade extending through the template into engagement with the underlying workpiece. The cutting tool is positively guided by the template whereby accurate engraving of the desired configurations can be repeated with no reduction in quality. The template holder also serves as a guide in establishing even margins for the sign as well as the desired spacing between letters so that the positioning of the engraving on the sign as well as the spacing between letters engraved, are quickly and easily established by proper positioning of the workpiece relative to the template holder. Also, the template holder is adapted to retain the templates in any one of four positions, 90° apart, whereby the letters, numerals or the like can be engraved to read either horizontally or vertically of the workpiece.

Since the workpiece is advanced beneath the template holder, continuous running designs can be engraved in the workpiece; also a combination of lettered and numbered signs can be engraved in a single workpiece. Subsequently, the workpiece can be severed between engraved portions thereof, if desired or necessary, to separate the workpiece into a number of individual signs. Accordingly, efficient and economic mass production of engraved signs is possible with the apparatus and method of the present invention.

As will be more fully appreciated with the detailed description of the apparatus hereinafter, it is adapted to make relatively deep cuts in the workpiece so that after the signs have been engraved, the entire face of the sign can be painted or stained and a thin layer thereof subsequently removed to leave the paint only in the engraved portions establishing a finished product with the engraved portions very neatly painted. It will also be apparent that large signs can be made with the apparatus of the present invention by engraving the desired rows of lettering on a single workpiece, cutting the workpiece into individual units corresponding to the rows of lettering desired for the finished sign and then clamping the individual units together in edge-to-edge overlying relation so that the desired rows of engraved lettering are presented in the finished sign.

More particularly, the apparatus of the present invention includes a support assembly mounted, in one preferred form, along one side of a work table which has adjustable workpiece guide means defining a path adjacent the support assembly in which the workpiece is disposed for selective longitudinal sliding movement relative to the support assembly. The support assembly has a base member secured to the work table and a slide member slidably mounted on the base member. The slide member carries a template holder in which various sized templates are removably held in overlying relationship with the workpiece. The templates are approximately as thick as the depth of the cut desired in the workpiece, and the router used with the apparatus has a guide bushing adapted to cooperate with the template in guided movement of the router so that relatively deep and accurate cuts can be made in the workpiece. The slide member of the support assembly carries clamping means for immobilizing or positively positioning the workpiece relative to the slide member prior to routing the desired letter or other configuration in the workpiece. A vacuum system is positioned adjacent a work area on the work table to withdraw cuttings in the work area thereby always maintaining a clean work area.

The support assembly can be removed from the work table and mounted directly on a workpiece, such as a picnic table, door or other large object, whereby engraved signs can be cut therein using substantially the same process as used when the support assembly is mounted on the work table. When the support assembly is mounted directly on the workpiece, the slide member of the support assembly is moved along the workpiece to position templates carried thereby in the desired positions overlying the workpiecce. According to the method of the present invention, engraved signs are produced in a continuous manner by first sliding a workpiece beneath the template holder and immobilizing the workpiece relative to the support assembly with one end of the workpiece spaced a predetermined distance from one edge of the template holder to establish a desired margin. A template with a solid portion, for supporting a router, and a cut-out portion is then placed in the template holder in overlying relationship with the workpiece with the guide bushing and cutter blade of the router positioned in the cut-out portion so that when the router is lowered into engagement with the workpiece, the router can be manipulated to cut a configuration in the workpiece corresponding to the cut-out portion of the template. After the desired configuration has been cut, the workpiece is then unclamped and advanced to a second selected position relative to the template holder whereby another template placed in the template holder will be spaced from the previously cut letter a predetermined distance. The above procedure can be repeated until the desired lettering for a sign or signs has been cut in the workpiece. The workpiece is then removed from the apparatus and the engraved space thereof is painted making sure that the engraved letters are completely covered. A thin layer of the engraved face is next removed so that the only paint remaining on the workpiece is in the engraved letters making them very distinct from their background. If more than one sign is engraved in a workpiece, the workpiece can be severed between engraved portions thereof to separate the signs into individual units having even margins at each end.

As will become more apparent with the detailed description hereinafter, the method and apparatus of the present invention avoids the necessity of laying out, centering and lettering a workpiece before it is actually engraved and also includes an inherent self-centering and letter spacing capability whereby the lettering is desirably spaced at selected locations and the workpiece then cut a pre-determined distance after the last letter to leave even margins at each end. The engraved signs can, therefore, be rapidly and accurately produced on a mass production basis. Since the workpiece is moved relative to the template holder between operative engraving positions, the spacing of the letters can be selected according to the shape and size of adjacent letters whereby when letters such as A, V, L, Y, W, T and P are used, uneven gaps do not exist between the letters. The aforementioned letters are unique because the maximum width of the letter exists only at an upper or lower portion thereof whereby it is desirable to partially overlap the spacing between these letters and other letters that may be complementary insofar as spacing between letters is concerned. Another important feature of the invention is that the above desirable features are obtained with an apparatus in which the router itself, as opposed to a tracing stylus connected through appropriate linkage to the router, follows the configuration of a cut-out portion of the template under the control of an operator while the cutting blade is cutting the desired configuration in the workpiece. In this manner, the router is not allowed to deviate from the desired path since the router itself is positively guided by the template and the operator.

Accordingly, it is an object of the present invention to provide a new and improved apparatus for engraving signs wherein the sign is movable between positively retained positions in the apparatus and a template is retained in overlying relationship with the sign to guide movement of a cutting tool having a cutting blade extending through the template into cutting engagement with the sign for engraving desired letters, numerals of other configurations in the sign.

It is another object of the present invention to provide an apparatus for making routed signs including a machine head assembly mounted on one side of a work table and carrying a template holder having means for retaining various sized templates in selected locations overlying a workpiece disposed on the work table whereby the cutter blade of a router extending through the template and guided therein by a guide bushing on the router can positively cut selected configurations in the workpiece.

It is another object of the present invention to provide an apparatus for routing signs having means for guiding movement of an elongated workpiece between selected fixed positions in the apparatus and a template holder disposed to retain templates in spaced overlying relationship with the workpiece whereby the cutting blade of a router can be lowered into the workpiece through the template for guided movement in cutting the desired configuration in the workpiece and including a vacuum head adjacent the workpiece for withdrawing cuttings from the work area.

It is another object of the present invention to provide a method of engraving signs or the like wherein a workpiece is advanced beneath a rigidly supported template between fixed positions in which letters are engraved in the workpiece by a cutting tool until a succession of letters are engraved for a sign or signs to be made from the workpiece and thereafter the engraved face of the workpiece is painted and a thin layer of the engraved face removed so that the paint remains only in the engraved areas.

The above and other objects, advantages and features of the present invention will become more readily appreciated and understood from the following detailed description of a preferred form of the invention when taken together with the accompanying drawings, in which:

FIG. 1 is a fragmentary perspective view of the sign making apparatus of the present invention;

FIG. 2 is a fragmentary top plan view of the apparatus of FIG. 1 with the workpiece in a different position and with parts broken away for clarity;

FIG. 7 is an enlarged fragmentary perspective view of the template holder of the apparatus of FIG. 1 with a template, template blanks and spacers shown separated therefrom;

FIG. 8 is a top plan view of a template used with the apparatus of FIG. 1;

FIG. 9 is a vertical section taken along line 9—9 of FIG. 8;

FIG. 10 is an enlarged fragmentary vertical section showing the template holder in a raised vertical position;

FIG. 11 is a fragmentary diagrammatic side elevation of the apparatus of FIG. 1 including a support assembly for suspending a cutting tool above the apparatus;

FIG. 12 is a diagrammatic perspective view of a cutting tool used with the apparatus of FIG. 1;

FIG. 13 is a fragmentary perspective view showing a portable portion of the apparatus of FIG. 1;

FIG. 14 is an enlarged diagrammatic vertical section taken through the work piece shown in FIG. 13 with a cutting tool; and FIG. 15 is a reduced diagrammatic fragmentary top plan view showing an embodiment of the present invention incorporating an enlarged template holder.

Figure 3:
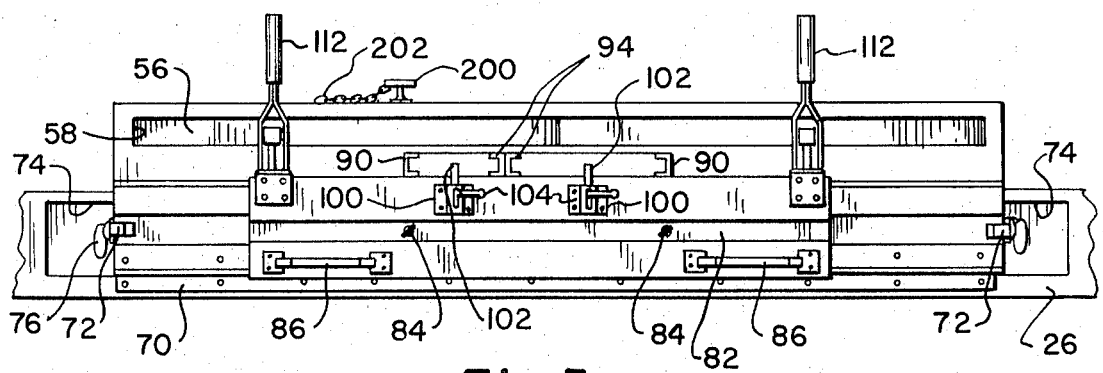
FIG. 3 is a fragmentary front elevation of the apparatus of FIG. 1.

Referring first to FIG. 1, the engraved sign making apparatus 20 of the present invention can be seen to include a support or machine head assembly 22 attached to the front face 24 of a work table 26 having a built-in vacuum system 28 along a rear portion thereof. An adjustable workpiece guide assembly 30 is mounted on the work table 26 defining a path adjacent the machine head assembly in which an elongated workpiece 32 may be disposed for sliding movement between fixed positions on the work table.

The machine head assembly 22 has a base member 34 and a slide member 36, the slide member being mounted on the base member for longitudinal sliding movement relative thereto and having a template holder 38 secured to the top surface 40 thereof extending rearwardly over a work area portion of the work table 26. The template holder 38, as will be more clearly explained later, is uniquely adapted to support a selected template or templates 42 in overlying alignment with the workpiece 32. The slide member 36 also carries on its top surface a pair of spaced workpiece clamps 44 adapted to press the workpiece downwardly against the top surface 46 on the work table or against a spacer plate 48 on the top surface whereby the workpiece is selectively prevented from movement relative to the slide member. As will be discussed in more detail later, the machine head assembly 22 can be removed from the work table and releasably attached to large workpieces such as picnic tables, doors, large signs, and the like which are too large to be supported by the work table shown in FIG. 1.

Figure 4:
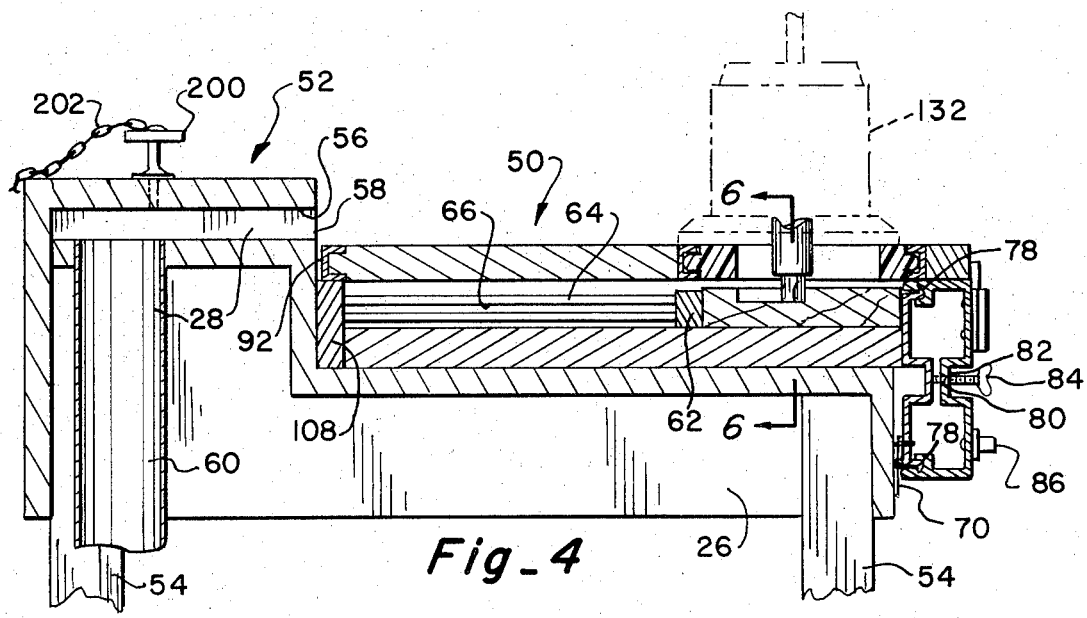
FIG. 4 is an enlarged vertical section taken along line 4—4 of FIG. 2.

Looking now at FIG. 4, the work table 26 is seen to have a forward work area 50 and a raised rearward portion 52. The work table is supported by legs 54 rigidly affixed to the underside thereof. The work area 50 is flat and rectangular shaped, as seen in FIG. 2, with its narrow dimension extending from front to back. The long dimension of the work area is preferably at least five feet long so as to adequately support workpieces of at least that length. The raised rearward portion 52 is triangular shaped in horizontal cross-section, FIGS. 1 and 2, defining a triangular shaped hollow cavity 56 flaring outwardly and forwardly to a broad but shallow front opening 58 across a substantial portion of the work area. The rearward most extent of the cavity 56 communicates with a downwardly extending tubular conduit 60 connected to a vacuum source which is not shown. In this manner, when the vacuum source is operative, a suction is created across the work area 50 of the work table sufficient to remove cuttings from the work area.

The workpiece guide assembly 30, which is best seen in FIGS. 1, 2 and 4, includes a guide bar 62 extending parallel to and spaced from the machine head assembly 22 to define a path therebetween for the workpiece, and adjustment arms 64 rigidly secured at their forward ends to the longitudinal ends of the guide bar and connected at some variable location along their length to the sides of the raised rearward portion 52 of the work table. Each of the adjustment arms 64 has a central horizontal longitudinally extending slot 66 cut therethrough for reception of a thumbscrew 68 threadedly received in a respective side of the rearward portion 52. The thumbscrews are adapted to selectively hold the associated adjustment arms 64 against the rearward portion to positively position the guide bar 62 at a selected spaced location from the machine head assembly. In this manner any width workpiece up to, for example, twelve inches can be accommodated between the guide bar and the machine head assembly.

The base member 34 of the machine head assembly 22 is attached to the front face 24 of the work table 26 by a piano hinge 70 for pivotal movement about a horizontal axis. As best seen in FIGS. 1 and 3, each longitudinal end of the base member 34 has a latch arm 72 that extends rearwardly into a recess 74 in the front face of the work table in which a pivotal latch 76 is mounted to selectively retain the associated latch arm 72 and thereby hold the base member of the machine head assembly tight against the front face of the work table. When the pivotal latch 76 is released, the base member 34 as well as the slide member 36 attached thereto can swing forwardly about the aforementioned horizontal axis, as shown in FIG. 10, for a purpose to be explained later.

The base and slide members of the machine head assembly are conventional elongated channelled bars having mating tongue and groove portions 78 along the upper and lower edges thereof allowing longitudinal sliding movement. Internally threaded holes 80, FIG. 4, are provided through a recessed face 82 of the slide member for receiving set screws 84 whereby the set screws can be tightened against a forward face of the base member to prevent relative longitudinal movement between the base and slide members when desired, and handles 86 are mounted on the slide member to facilitate the sliding movement when the set screw 84 are not tightened against the base member. The machine head assembly extends above the work surface of the table a distance slightly greater than the thickness of conventional 2-inch lumber, which is actually only 1⅝ inches in thickness. Accordingly, a workpiece of conventional 2-inch lumber resting on the top surface of the work table would not extend above the machine head assembly. If the workpiece is conventional 1-inch lumber, which is actually three-quarters of an inch in thickness, the large spacer plate 48, substantially corresponding in size and shape to the work area and also being of 1-inch lumber, would be placed on the work table in the work area so that the workpiece would be positioned on top of the spacer plate and would then have a height slightly lower than the top of the machine head assembly. In this manner, both 1 inch and 2 inch lumber can be accommodated with the apparatus with the template holder 38 being spaced slightly above the workpiece.

The template holder 38, which is an important part of the apparatus, has an outer frame 88 composed of elongated side channel bars 90 connected at one end to the top surface 40 of the slide member 36 and an end channel bar 92 interconnecting the opposite ends of the side channel bars in a manner such that they are adapted to retain various sized templates 42 at selected positions within the outer frame 88. The template holder also includes two back-to-back, inner channel frame members 94 which are anchored at one end to the end channel bar 92 and extend forwardly and are fixedly secured along with the side channel bars to the top surface 40 of the slide member. The channels in the inner frame members 94 open toward the closest side frame member 90 to define two pair of receiving tracks of different widths for holdably receiving the side edges of templates of corresponding width as well as template spacers 96 provided to assist positioning of the templates at selected locations longitudinally of the side and inner frame members. As is best seen in FIG. 1, the forward end of the template holder 38 is open for reception of the templates 42, template blanks 98 or template spacers 96, and lock pin devices 100 are mounted on a forward face of the slide member for retaining the templates, template blanks and template spacers in the template holder. The lock pin devices include lock pins 102 which are slidable vertically within sleeve-type brackets 104 for movement between raised locking positions and lowered open positions so that the templates, template blanks, and template spacers can be freely slid into or removed from the template holder when desired.

Each of the templates 42 is square and is sized to fit into one of the pairs of spaced tracks, and each can be positioned within the template holder 38 at a desired position for centering above the underlying workpiece 32, regardless of its width. Dependent upon the size of the template and workpiece, it will be apparent that a plurality of rows of lettering or the like can be cut in the workpiece. The template blanks 98 are similar in construction to the templates themselves but do not have cut-out portions 106 therein as do the templates. The blanks 98 are of course used to fill space within the template holder not occupied by the templates or the template spacers. The template spacers 96 are interposed between the templates and template blanks and are channelled like the frame members 90, 92 and 94 to receive and support the peripheral side portions of the templates and template blanks as will be described later.

In order to positively support the template holder 38, a template holder support 108 is anchored in the work area to the top surface of the work table adjacent to the raised rearward portion 52 thereof with its uppermost surface at the same elevation as the top surface of the machine head assembly 22 which, as mentioned hereinbefore, is slightly above the top surface of a workpiece in the apparatus. Preferably, the template holder is spaced approximately one-eighth of an inch above the top surface of the workpiece so that cuttings accumulating beneath the template holder and on top of the workpiece can be removed therefrom by the suction from the vacuum system 28 so as to prevent the cuttings from obstructing corners of the cut-out portions 106 of the templates and to allow precise cutting into the workpiece corresponding to the cut-out portion of the template.

The workpiece clamps 44 are identical and each includes an extension arm 110 and a bifurcated handle 112. The handle 112 is pivotally connected to an upstanding rib 114 on an angle iron bracket 116 anchored to the slide member 36 of the machine head assembly. The rearwardmost end of the extension arm carries a vertical abutment rod 118 with a rubber abutment head 120 on its lower end. The abutment rod 118 is threadedly received in an opening in the rearward end of the extension arm 110 for axial adjustable movement. Forward pivotal movement of the handle from the vertical position shown in FIGS. 1 through 3 causes the extension arm to pivot upwardly and forwardly thereby raising the abutment head away from the top surface of the workpiece. Conversely, rearward pivotal movement of the bifurcated handle into its vertical position causes the abutment head to move into pressing engagement with the top surface of the workpiece with a pressure dependent upon the axial position of the abutment rod relative to the extension arm. The workpiece can, therefore, be quickly clamped against the work surface or released therefrom by rearward or forward pivotal movement respectively of the bifurcated handle. It will be appreciated that through use of the workpiece clamps, the workpiece can be slid between selected longitudinal positions on the work surface and positively clamped in the positions in a quick and efficient manner.

The templates 42, FIGS. 8 and 9, are preferably square in shape so that they can be positioned in the template holder 38 in any one of four positions 90° apart. In other words, the side dimensions of any given template are equal and correspond to the spacing between a side frame member 90 and an inner frame member 94 whereby a template having, for example, a cut-out portion 106 in the configuration of an alphabetical letter can be placed between the respective frame members so as to be readable across or longitudinally of the workpiece in any one of four different positions. It should also be noted that since the inner frame members 94 are shaped different distances from the two side members 90, two sizes of square templates can be used with the template holder. Also, rectangular shaped templates could be used with their length extending from front to back of the template holder if desired.

While the templates 42 may be made of any suitable material, one preferred embodiment would comprise a molded plastic body having a hollow undersurface 122, FIGS. 8 and 9, a flat top surface 124 and peripheral guides 126 extending outwardly along the side edges of the template adapted to fit slidably but snuggly into the grooves of the inner and outer frame members 94 and 90 respectively of the template holder. The flat top surface 124 of the template could be inclined whereby the cut in the workpiece would be correspondingly inclined giving an unusual and attractive appearance. The cut-out portions 106 would preferably be molded into the body of the template in the shape of the alphabetical letter, numeral or other configuration desired for the particular template leaving bottom and left margins which are uniform for all templates. Additionally, spacing apertures 128 could be provided along one side of the template and spaced from the cut-out portion to facilitate desired spacing between letters in a manner to be explained hereinafter. The templates are reinforced by ribbing 130 that extends downwardly from the top surface along the side edges of the template, along each side of the cut-out portion and around the spacing apertures so that the templates are strong enough to support a cutting tool used to cut the desired configurations in the underlying workpiece. By making the templates of a plastic material, they will provide an extremely long life, particularly in view of the fact that, as will be explained later, the cutter blade of the cutting tool in accordance with the present invention need never contact the template. Also, the template can be of any desired thickness to facilitate any depth of cut in the workpiece as will become more clear hereinafter.

The cutting tool used in the present invention may be any one of numerous commercially available routers preferably modified so that it is better suited for use with the apparatus of the present invention. A router 132 which has been suitably modified for use with the present invention is shown in FIG. 12 having a motor housing 134 mounted above and in concentric relation with a circular base plate 136 and having diametrically opposed gripping handles 138, one of which has an on/-off finger switch 140 for operating the router. The base plate 136 has a circular opening 142 in the center thereof in which a guide bushing 144 is releasably attached and through which the cutter blade 146 extends. An auxiliary base plate 148, shown attached to the bottom of the normal base plate 136 may be used when the base plate of the router needs to span broad areas larger than the diameter of the normal base plate for stabilizing the router; however, in normal operation the auxiliary base plate would not be needed or use. Preferably, a wedge-shaped segment 150 of the base plate is removed from a front portion thereof so that the cutter blade and the guide bushing are clearly visible from above the router and it is easy to insert the cutter blade and guide bushing into the cut-out portion 106 of the template. Also, with the wedge-shaped segment of the base plate removed, the cutting action of the router in the workpiece can be observed as the router follows the cutout portion of the template.

Figures 5, 6:
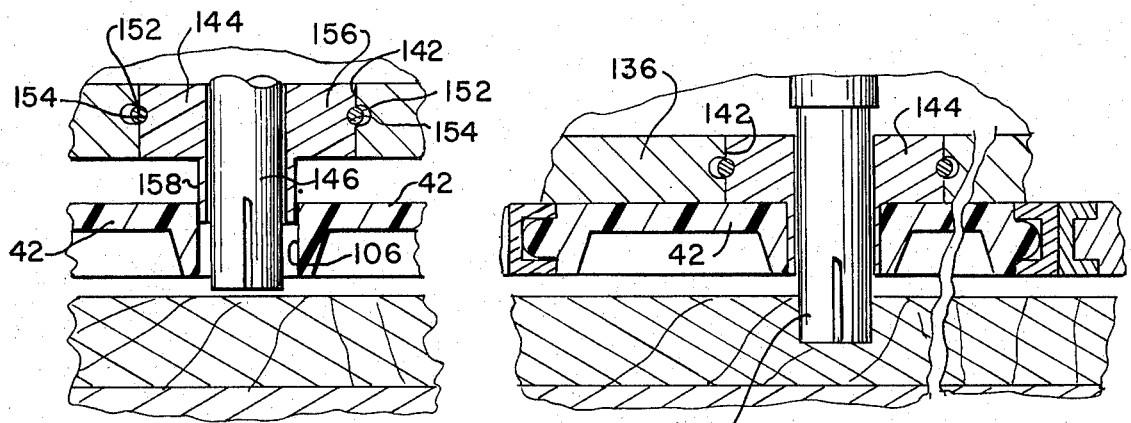
FIG. 5 is an enlarged fragmentary vertical section taken through a portion of the apparatus of FIG. 1 illustrating the cooperation between the cutting tool, the template and the workpiece.
FIG. 6 is an enlarged fragmentary vertical section taken along line 6—6 of FIG. 4.

As is clearly shown in FIGS. 5 and 6, the guide bushing 144 is adapted to be snapped into the circular opening 142 in the base plate 136 by a peripheral retention ring 152 disposed in an annular groove 154 in an upper body portion 156 of the guide bushing. A downwardly extending sleeve 158, which may be any desired length, on the guide bushing circumscribes the cutter blade 146 along a portion of its length.

The router 132 is preferably supported on a router support assembly 160, FIG. 11, for rolling movement along a longitudinally extending track 162 above the work table. The track 162 may be anchored to the ceiling 163 or other upper support surface and comprises an elongated bar of generally C-shaped transverse cross-section. The track 162 is adapted to suspend the support assembly which includes a roller 164 on the end of a generally C-shaped bracket 166 on the support assembly and which is adapted to roll along the track 162. The C-shaped bracket 166 has a U-joint 167 which supports for universal pivotal movement a depending hollow support shaft 168 of the assembly 160 having an outer concentric abutment ring 170 fixedly secured thereto adjacent its lower end. A support rod 172 of the support assembly is slidably received within the support shaft 168 and is fixedly attached to an outer concentric slide ring 174 through longitudinal slots 176 in the side wall of the support shaft such that the ring 174 is free to slide longitudinally along the length of the support shaft. A compression spring 178 in the assembly 160 is concentric with the tubular shaft and abuts against the undersurface of the slide ring 174 and the upper surface of the abutment ring 170 to bias the support rod in an upward direction. The lower end of the support rod is connected to the top of the router 132 by a universal joint 180 whereby it is free to swing through 360° and can be lowered by downward pressure thereon into cutting engagement with a workpiece disposed on the underlying work table. Of course, the router can be moved longitudinally of the work table by rolling movement along the track.

As will become more apparent hereinafter, the apparatus 20 is capable of use in mass producing engraved signs on a continuous board method in a rapid and efficient manner. Templates can be easily slid into or removed from the template holder 38 and therefore can be quickly interchanged during the course of engraving preselected configurations in the underlying piece. It should also be appreciated that with the router disposed immediately above the work table, it can be moved into cutting engagement with the workpiece while being directly guided by a template. Many of the advantageous features of the apparatus of the present invention will become more apparent with the description of the method of the present invention hereinafter.

The engraved sign making method of the present invention can be characterized as a continuous board method of forming wooden, aluminum, formica, plastic, or other similar signs wherein an elongated board or plank is advanced longitudinally through the apparatus 20 between preselected positions in which desired letters, numerals or other configurations corresponding to cut-out portions of guide templates are engraved in one face of the board. After the desired configurations are engraved in the board, the engraved face of the board is sealed with a conventional sealant, painted so that the paint covers the engraved lettering, and a thin layer of the engraved face of the board removed after the paint dries so that paint is left only in the engraved areas. It will be appreciated that the sealant will prevent the paint from bleeding into the grain thereby avoiding blurred lettering. Another coat of sealing material may thereafter by sprayed on the board for preservation purposes. Since a portion of the engraved face of the board is removed after engraving, it is important that the engravings be deep enough in the board to leave a well defined engraved sign. For example, it has been found that the engravings could be made at least one-half inch in one pass, which to applicant's knowledge has not been possible with previously used systems wherein the cutting tool is directly guided by a template or other pattern. In order to make a deep cut, the invention employs the use of templates 42 which are at least one-half inch in thickness and a router having a guide bushing 144 with a sleeve portion 158 which is approximately one-half inch long and with the cutter blade 146 extending at least five-eighths of an inch beyond the terminal end of the sleeve portion. In this manner, as is clearly shown in FIGS. 5 and 6, before the router is energized, the cutter blade can be inserted into the cut-out portion of the template with the lower terminal end of the sleeve portion 158 extending a small distance into the cut-out portion 106 so that cutter blade is radially spaced from the template and will not cause damage thereto when rotating. The router then can be energized and the cutting blade lowered into the board so that the upper body portion 156 of the guide bushing abuts the top surface of the template thereby allowing the cutting blade to extend approximately a half-inch into the board. As can be appreciated, this could not be done using traditional relatively thin templates since the cutting blade must extend at least five-eighths of an inch beyond the end of the guide bushing. In order to prevent the cutter blade from engaging the walls of the template, the sleeve portion must extend into the cut-out portion before the cutter blade penetrates the board. Accordingly, the thickness of the template, the length of the sleeve portion of the guide bushing, and the extension of the cutter blade away from the guide bushing are all critical factors in establishing a deep cut in the board so that a thin layer of the top surface of the board can be removed and still leave engraved letters of sufficient depth to be visible.

In practicing the method of the present invention on the previously described apparatus, the machine head assembly 22 would normally first be pivoted forwardly, as in FIG. 10, lifting the template holder 38 up and away from the top of the work table so that the workpiece 32 could be easily placed in front of the workpiece guide bar 62 and adjacent to the front edge of the work table. The template holder would then be lowered into overlying relationship with the workpiece and latched in place by securing the latches 76. A desired left-hand margin for a sign to be engraved in the workpiece would be established by appropriately spacing the left-hand end of the workpiece, as viewed in FIGS. 1, 2 or 7, from the left-hand edge of the template holder. The workpiece would then be clamped in place by the workpiece clamps 44 and a desired template 42 slid into the template holder so that it was centered or otherwise desirably positioned over the workpiece. The associated lock pin device 100 would then be raised to secure the template within the template holder. By utilizing appropriate spacers and template blanks, the template can be positioned in the frame so as to be centered or otherwise desirably positioned over workpieces of any width that will fit on the work table. When the desired template is secured in the template frame, the router is lowered into the cut-out portion of the template, as shown in FIG. 5, until the sleeve portion 158 of the guide bushing 144 extends slightly into the cut-out portion 106 thereby assuring that the cutter blade 146 will not contact the template. As discussed previously, the cutter blade will not penetrate the workpiece when the router is in this position due to the thickness of the template, the length of the sleeve portion, and the distance that the cutting blade extends axially away from the sleeve portion. After the sleeve portion has been moved into the cut-out portion of the template, the router can be started by actuating the on/off switch 140 provided on one of the handles of the router. It is preferable that the on/off switch be on a handle of the router as opposed to some other location on the router so that the router is securely gripped by the operator and under positive control when it is started. The router is then lowered into the workpiece, as shown in FIG. 6, and allowed to follow the cut-out portion of the template to engrave or cut the desired letter, numeral or other configuration in the workpiece. When the entire letter has been engraved, the router is shut off and lifted out of the template so that when properly operated, there is no danger of the cutter blade contacting the template and causing damage thereto.

After the first letter has been routed, the associated lock pin device is lowered and the template removed from the template frame so that the template carrying the second letter to be routed can be inserted in its place and secured therein by the lock pin device. Next, the workpiece is unclamped and slid to the left, as viewed in FIG. 2, beneath the template frame until the right-hand edge, or other reference point, of the first routed letter is aligned with the left-hand edge of the left side frame member of the template holder. With certain letters, such as, A, V, L, T, Y, W or P, it is better not to align the left-hand edge of the template holder with the right-hand edge of the letter but rather to overlap the letter some selected amount so that the spacing between letters is properly balanced. These are the so-called problem letters in engraving since the right side of the letter has its greatest lateral extent either at the top or bottom of the letter and not at both the top and bottom as do the other letters such as B, H, M, N, etc.; and, for a properly balanced sign, the space adjacent to the problem letters should be less than with the latter mentioned letters.

Once the desired spacing between the left edge of the template holder 38 and the first engraved letter is established, the workpiece is again clamped to the work table with the workpiece clamps 44. The next letter is then routed in the same manner in which the first letter was routed and the process is continued until the desired letters in a sign, or any number of signs to be cut in the workpiece, have been engraved. Periodically, the template holder can be raised, as shown in FIG. 10, to clean cuttings from between the template holder and the workpiece thereby avoiding build-up of the cuttings which could cause a loss of time in production as well as imperfection in the engraved letters. Since the workpiece is positively clamped in place and the template holder is similarly positively positioned, when the template holder is lowered back into its normal overlying relationship with the workpiece, the relative relationship between the template holder and the workpiece will not have changed so that engraving can be continued without re-positioning the workpiece. It should also be pointed out at this time that since the router is directly guided by the template, as opposed to a pantograph method wherein a stylus follows the cut-out portion of the template and the router is spaced therefrom by a parallelogram linkage to follow guided movement of the stylus, it is impossible for the router to move away from the desired path of movement even when encountering unusual grain or knots in the workpiece. In fact, in actual practice, the router will move directly through a knot in a workpiece maintaining the perfect configuration of the cut-out portion. Due to this characteristic of the apparatus, signs can be engraved in knotty pine and other materials which were previously difficult to engrave.

The template holder 38 may be of any size or shape so that it can receive larger templates having complete phrases or words cut-out therein. For example, as shown in FIG. 15, a template holder 190 is large enough to cover the entire work surface of the work table 26. The template 192 shown in FIG. 15 has the words "Keep Out" cut-out therein and is positioned and positively held in the template holder by spacers 194 and blank templates 196 on each side thereof whereby an entire sign can be cut without moving the workpiece. The workpiece 198 illustrated in FIG. 15 is twelve inches wide and thereby covers the complete depth of the work surface.

While normally letters would be engraved in the workpiece from left to right as previously described, it is also possible with the present invention to engrave the letters, numerals or other configurations from right to left. The desired spacing between letters is obtained by use of the spacer openings 128 in the templates 42 and a positioning pin 200, FIGS. 1 through 4, that may be carried on an elongated chain 202 anchored to the top of the raised rearward portion 52 to prevent its loss when not in use. When cutting letters from right to left, the first letter would be cut and then the workpiece moved to the right relative to the template holder until the spacing apertures were aligned with a certain portion of the previously routed letter, the certain portion depending upon whether or not the letter was a so-called problem letter. The spacing is easily accomplished by inserting the positioning pin 200 into one of the spacer openings 128 and moving the workpiece to the right until the pin protrudes into the previously cut letter at the desired location. When the appropriate spacing between the letters has been obtained, the workpiece can be clamped in position by the workpiece clamps and the second letter cut with the router in the manner previously described.

It will be appreciated that large signs can be made from a single relatively narrow workpiece utilizing the method and apparatus of the present invention by engraving groups of lettering in the workpiece at desired spacings, each group of lettering corresponding to one row of lettering of the desired finished sign. The engraved portions of the workpiece can be painted as described hereinbefore then severed into segments containing the desired groups of lettering and clamped together in horizontal edge-to-edge relationship with the proper sequence of grouped lettering progressing from top to bottom of the sign.

Referring now to FIGS. 13 and 14, the machine head assembly 22 is seen removed from the work table 26 and is removably attached to the side of a large workpiece 210 by double-head nails 212 passed through the base member 34 of the machine head assembly and into the side of the workpiece. A support strip 214 would also be anchored to the workpiece adjacent to the rearward edge of the template holder 38 to support the rear edge of the template holder in spaced relationship from the top surface of the workpiece as desired. The letters would be engraved in the workpiece in a manner similar to the method previously described except that instead of sliding the workpiece beneath the template holder, the set screws 84 passing through the slide member 36 of the machine head assembly are loosened between engraving operations and the slide member slid longitudinally of the base member until the desired spacing between the letters is obtained. Of course by tightening the set screws against the base member, the template holder is positively positioned relative to the workpiece for engraving a subsequent letter. Accordingly, the machine head assembly is portable and can be used to engrave lettered signs or other nomenclature in large workpieces such as doors, picnic tables, etc.

Although the present invention has been described with a certain degree of particularity, it is understood that the present disclosure has been made by way of example and that changes in details of structure may be made without departing from the spirit thereof.

What is claimed is:

1. Apparatus for engraving letters or the like in a workpiece with a cutting tool having a cutting blade, the improvement comprising:
    a support frame disposed adjacent to one side of the workpiece with at least a portion thereof movable relative to the workpiece;
    at least one template each provided with a cut-out portion passing therethrough;
    a template holder attached to the support frame and extending away from the support frame in overlying relationship to the workpiece, said template holder including means providing for interchangeable insertion of different sized templates in different positions in the template holder; and
    guide means operative to guide the movement of the cutting tool along said cut-out portion of a template whereby a portion of the workpiece corresponding in configuration to the cut-out portion of the template can be cut in the workpiece by the cutting blade of the cutting tool.

2. The apparatus of claim 1 wherein said template holder includes inner frame members that are adapted to cooperate with the outer framework in retaining various sized templates in the template holder.

3. The apparatus of claim 1 wherein said template holder has outer side frame members extending normally away from said support frame in spaced overlying relationship with the workpiece, and wherein said retention means comprises inwardly opening channels for slidably receiving side edges of the templates for retention thereof in parallel overlying relationship with the workpiece.

4. The apparatus of claim 1 wherein said support frame includes a base member and a slide member, the slide member being movable relative to the base member along said one side of the workpiece, and said template holder being attached to the slide member for movement therewith.

5. The apparatus of claim 4, further including set means selectively interconnecting the slide member and the base member for immobilizing the slide member relative to the base member.

6. The apparatus of claim 1, further including a work table having an upper work surface and a front face, attachment means for securing said support frame to the front face of the work table such that the template holder extends outwardly over the work surface in parallel relation thereto, and workpiece guide means adjustably connected to the work table for defining a path on the work surface and adjacent to the support frame in which the workpiece is slidably disposed.

7. The apparatus of claim 6 wherein said support frame includes a base member attached to the front face of the work table and a slide member slidably connected to the base member for movement along said front face, set means selectively interconnecting the slide member and the base member for immobilizing the slide member relative to the base member, and clamp means on the slide member releasably engageable with the workpiece for immobilizing the workpiece relative to the slide member.

8. The apparatus of claim 7, further including vacuum means adjacent said work surface for withdrawing cuttings from the workpiece.

9. An apparatus for engraving letters or the like in a workpiece comprising in combination,
    a work table having an upper flat work surface and a front face;
    a support frame mounted on the front face and having a base member and a slide member slidably connected to the base member;
    hinge means pivotally connecting the base member to the front face of the work table such that the support frame extends above the work surface a distance slightly greater than the thickness of the workpiece;

set means selectively interconnecting the slide member and the base member for immobilizing the slide member relative to the base member;

a workpiece guide adjustably connected to the work table for extension over the work surface and including a guide member disposed in parallel relation to the front face of the work table defining a path on the work surface and adjacent said front face in which the workpiece is slidably disposed;

clamp means secured to said slide member and selectively engageable with the workpiece for immobilizing the workpiece relative to the slide member;

a template holder having outer side members affixed at one end to and extending normally away from said slide member in overlying relationship with the workpiece, and an end frame member interconnecting the other ends of said side frame members, each of said side frame members and said end frame member having inwardly opening channels;

template means having a cut-out portion passing therethrough and side edges adapted to be slidably retained in said channels whereby the template means is held in parallel overlying relationship with said workpiece; and a cutting tool with a cutter blade adapted to selectively extend through said cut-out portion of the template means into cutting engagement with the workpiece, said cutting tool having a guide bushing therein concentric with the cutter blade for guiding movement of the cutting tool along said cut-out portion of the template whereby a portion of the workpiece corresponding in configuration to the cut-out portion of the template can be cut in the workpiece.

10. The apparatus of claim 9 wherein said template means is at least one-half inch thick, said cutting tool has a base plate engageable with the top surface of the template means, said guide bushing extends away from the undersurface of the base plate at least one-half inch, said cutting blade is rotatable and extends at least one-half inch away from the guide bushing, and said template means is spaced approximately one-eighth inch from the work surface so that the cutting blade is adapted to make a cut approximately one-half inch deep in the workpiece.

11. The apparatus of claim 1 wherein said cutting tool has a base plate with an undersurface engageable with the top surface of the template, said cutter blade is rotatable and extends downwardly through said base plate and further including a guide bushing mounted in said base plate in concentric relation to said cutter blade, said guide bushing having a sleeve portion surrounding said cutter blade and extending away from said base plate along a portion of the length of said cutter blade.

12. The apparatus of claim 11, further including releasable attachment means interconnecting said guide bushing and said base plate so that the guide bushing can be removed from the base plate.

13. The apparatus of claim 11 wherein said base plate comprises a relatively flat and circular planar member concentric with said cutter blade and having an arcuate portion thereof removed whereby said cutting blade is visible from above the base plate through said removed portion.

14. The apparatus of claim 1 wherein said template comprises a square molded plastic body having a flat upper surface and a recessed lower surface, said cut-out portion passing through the body and defining the configuration desired to be cut in the underlying workpiece, and ribbing extending downwardly from the flat upper surface around the periphery of the body and along each side of the cut-out portion to reinforce the body so that it serves as a rigid support for the cutting tool while the cutting tool is cutting the associated configuration in the workpiece.

15. In apparatus for engraving elongated workpieces with engraving means, the combination of:

a template holder having an outer framework adapted to releasably retain a template therein;

support means for supporting the template holder in overlying relationship with the template;

a template releasably inserted in said template holder having a cut-out portion therethrough corresponding in configuration to the configuration to be engraved in the workpiece, with the engraving means operative to pass downwardly through the cut-out portion of the template and into engagement with the workpiece;

workpiece guide means adjustably connected to the work table for defining a guide path on the work surface and adjacent to the support frame in which the workpiece is slidably disposed for longitudinal advancement of the workpiece beneath the template holder; and means for immobilizing the workpiece relative to the template holder.

16. In the apparatus of claim 15, said template holder having straight parallel side frame members and an end frame member normal to and interconnecting corresponding ends of the side frame members, each of said side frame members having a horizontal inwardly opening channel adapted to slidably receive a side edge of said template so as to retain the template between said side frame members.

17. In the apparatus of claim 16, further including a pair of inner frame members parallel to and positioned between said side frame members, each of said inner frame members having a horizontal channel adapted to receive a side edge of said template and opening toward the closest side frame member to cooperate with the side frame member in establishing retention means for supporting the template.

18. In the apparatus of claim 17, further including means for retaining the template holder in parallel overlying relationship with the face of the workpiece which is to be engraved.

* * * * *

PO-1050
(5/69)

UNITED STATES PATENT OFFICE
CERTIFICATE OF CORRECTION

Patent No. 3,860,050        Dated 3 April 1975

Inventor(s) Donald D. Banks

It is certified that error appears in the above-identified patent and that said Letters Patent are hereby corrected as shown below:

Column 2, line 54, cancel "workpiecce" and substitute -- workpiece --.

Column 6, line 33, cancel "screw" and substitute -- screws --.

Column 9, line 15, cancel "use" and substitute -- used --.

Column 10, line 35, after "inch" add -- deep --.

Column 13, line 29, cancel "double-head" and substitute -- double-headed --.

Signed and sealed this 20th day of May 1975.

(SEAL)
Attest:

RUTH C. MASON
Attesting Officer

C. MARSHALL DANN
Commissioner of Patents
and Trademarks